United States Patent [19]

Matsumura et al.

[11] Patent Number: 4,483,617
[45] Date of Patent: Nov. 20, 1984

[54] OPTICAL GYROSCOPE WITH LARGE PROPAGATION CONSTANT DIFFERENCE

[75] Inventors: Hiroyoshi Matsumura, Saitama; Toshio Katsuyama, Hachioji; Tsuneo Suganuma, Tokorozawa, all of Japan

[73] Assignee: Hitachi, Ltd., Tokyo, Japan

[21] Appl. No.: 354,187

[22] Filed: Mar. 3, 1982

[30] Foreign Application Priority Data

Mar. 4, 1981 [JP] Japan .............................. 56-29029[U]
Mar. 30, 1981 [JP] Japan .............................. 56-43788[U]

[51] Int. Cl.³ ........................ G01B 9/02; G01C 19/64
[52] U.S. Cl. ................................ 356/350; 350/96.30; 356/351
[58] Field of Search ............................ 356/350, 351; 350/96.30, 96.33

[56] References Cited

U.S. PATENT DOCUMENTS

4,179,189 12/1979 Kaminow et al. ................ 350/96.33
4,274,854 6/1981 Pleibel et al. ..................... 350/96.30

FOREIGN PATENT DOCUMENTS

2046470 11/1980 United Kingdom .

OTHER PUBLICATIONS

Schiffner et al., "Reciprocity of Birefringent Single—Mode Fibers for Optical Gyros", Applied Optics, vol. 18, #13, Jul. 1, 1979, pp. 2096-2097.
Ramaswamy et al., "Single Polarization Optical Fibers", Exposed Cladding Technique", Appl. Phys. Lett. 33 (9), Nov. 1, 1978, pp. 814-816.
"Birefringence in Elliptically Clad Borosilicate Single—Mode Fibers" Ramaswamy et al., Applied Optics, vol. 18 #24, Dec. 15, 1979, pp. 4080-4084.
"Linear Polarization in Birefringent Single—Mode Fibers", Stolen et al., Appl. Phys. Lett. 33 (8), Oct. 15, 1978, pp. 699-701.
"Fiber—Ring Interferometer: Polarization Analysis", Ulrich et al., Optics Letters, vol. 4, No. 5, May 1979, pp. 152-154.

*Primary Examiner*—Vincent P. McGraw
*Attorney, Agent, or Firm*—Antonelli, Terry & Wands

[57] ABSTRACT

In an optical gyroscope comprising a coil of an optical fiber having opposite ends on which linearly polarized input light beams are incident and from which output light beams are derived which create an interference pattern to be detected, the optical fiber has orthogonal principal axes along which the light beams propagate at a large propagation constant difference. The application of the linearly polarized input light beams to the opposite ends of the optical fiber coil is such that the polarization plane of the linearly polarized light beam coincides with the same principal axis on the opposite ends. Thus, polarization characteristics of the output light beam from the optical fiber coil becomes time invariant and the light paths for the two light beams coincide with each other. In particular, in order to minimize the influence of external disturbances, the optical fiber has a structure defined by $$|N_x - N_y| > \lambda / R_o$$

where $N_x$ and $N_y$ are refractive indices of said optical fiber in directions of the orthogonal principal axes, $R_o$ is the radius of said optical fiber coil, and $\lambda$ is the wavelength of the light beam.

4 Claims, 4 Drawing Figures

OPTICAL GYROSCOPE WITH LARGE PROPAGATION CONSTANT DIFFERENCE

This invention relates generally to optical gyroscopes and more particularly to an apparatus for measuring direction and position on the basis of changes in the phase of the light beam propagating through an optical fiber with movement or rotation thereof.

In optical gyroscopes, linearly polarized light beams are applied to opposite ends of an optical fiber coil wound in a circular form, and the intensity of an interference pattern of the two light beams which have propagated through the coil is measured for detection of rotation angle and angular velocity of the optical fiber coil.

Accordingly, the polarization planes of the two linearly polarized light beams propagating in opposite directions through the optical fiber coil must lie on the same plane.

In the past, to materialize the optical gyroscope, a single mode fiber having a circular cross-section has been used as the optical fiber. However, under the application of the linearly polarized input light beam to the single mode fiber, the output light beam therefrom tends to undergo irregular polarization characteristics giving rise to an elliptic polarized light beam, a circular polarized light beam or a linearly polarized light beam subject to a polarization plane of a varying inclination. This is because a small bending or vibration of the optical fiber facilitates energy exchange between fundamental propagating modes in which polarization planes are perpendicular to each other. For this reason, the polarization characteristics of the two output light beams become time variant. Such variations are observed as measurement noises in the optical fiber gyroscope which constrain measurable minimum rotation angle and angular velocity.

In addition, since in the conventional optical fiber the principal axis displaces dependent on the bending of the optical fiber, it is uncertain if an input light beam incident on one end and an input light beam incident on the other end propagate along the same light path. Consequently, the requirement for clockwise and counterclockwise light beams to propagate the same light path length is not satisfied and difficulties are encountered in measurement of an absolute value of angular velocity $\omega$, preventing availability of practically efficient optical gyroscopes at present.

It is therefore an object of this invention to provide a practically efficient optical gyroscope wherein polarization characteristics of the output light beams of an optical fiber coil are time invariant and light paths for two light beams are coincident.

To accomplish the above object, according to the invention, in an optical gyroscope comprising a coil of an optical fiber having opposite ends on which linearly polarized input light beams are incident and from which output light beams are derived which create an interference pattern for detection of angular velocity and rotation angle of the optical fiber coil, the optical fiber has orthogonal principal axes along which the light beams propagate at a large propagation constant difference, and the application of the linearly polarized input light beams to the opposite ends of the optical fiber coil is such that the polarization plane of the input light beam coincides with the same principal axis on the opposite ends.

In the optical gyroscope in accordance with this invention, clockwise and counterclockwise linearly polarized light beams in the optical fiber propagate along the same principal axis so that the light beams always propagate a constant light path length to thereby ensure a stable operation.

Further, even if the phase velocity is different for the two orthogonal principal axes of the optical fiber, the polarization planes in process of the propagation will not be subject to energy conversion between propagating modes which results from the bending or vibration of the optical fiber, thereby ensuring a stable operation of the optical gyroscope.

The above-mentioned and other features and objects of this invention will be more apparent by reference to the following description taken in conjunction with the accompanying drawings.

Figure 1:
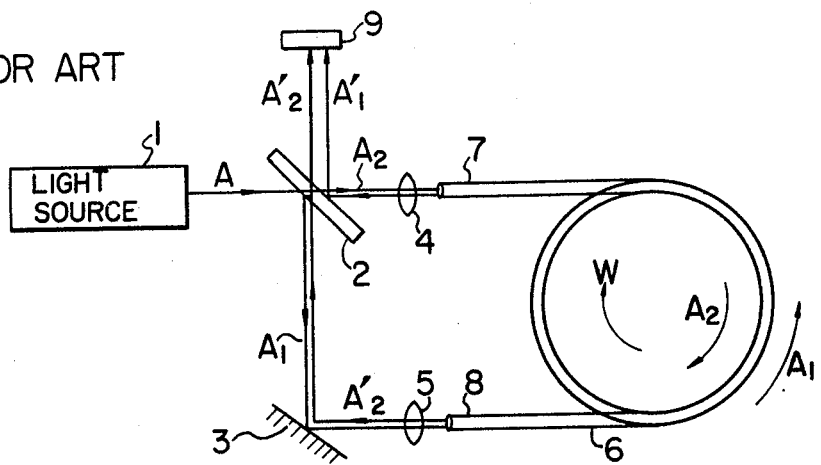
FIG. 1 is a schematic representation of an optical gyroscope useful in explaining the principle of the gyroscope.

For better understanding of the present invention, the principle of an optical gyroscope will first be described with reference to FIG. 1.

As shown, a linearly polarized light beam A emitted from a light source (laser source) 1 is split by a half mirror 2 into two beams $A_1$ and $A_2$. The two beams $A_1$ and $A_2$ passing through lenses 4 and 5 are applied to opposite ends 7 and 8 of an optical fiber 6 in the form of a coil, respectively. The light beam $A_1$ directed by the lens 5 so as to be incident on one end 8 of the optical fiber coil 6 propagates therein counterclockwise, issues out of the other end 7, and impinges on the half mirror 2. A light beam $A_1'$ reflected on the half mirror 2 reaches a screen 9. On the other hand, the light beam $A_2$ directed by the lens 4 so as to be incident on the other end 7 of the optical fiber coil 6 propagates therein clockwise, issues out of the one end 8, and impinges on a mirror 3. A light beam $A_2'$ reflected on the mirror 3 also reaches the screen 9. In this process, with the rotation of the optical fiber coil at an angular velocity $\omega$, the phase difference which is proportional to the angular velocity $\omega$ is created between the light beams $A_1$ and $A_2$ and as a result, an interference fringe appears on the screen 9. The intensity of the interference fringe varies with the phase difference due to $\omega$ and conversely. The angular velocity $\omega$ can be measured by detecting the change in the intensity.

From the computation in consideration of Sagnac effect, the phase difference, $\Delta Z$, is $$\Delta Z = 2\omega L R / \lambda C$$

where L represents the length of the optical fiber, R the radius of bending of the optical fiber, $\lambda$ the wavelength of the light beam, and C the velocity of light. When the change in the intensity is detected at the center of the screen 9, the light intensity, I, is related to the phase difference by $I \alpha \cos^2 \Delta Z$. Accordingly, by detecting the light intensity I, the angular velocity $\omega$ of the optical fiber coil can be measured. An angle through which the coil rotates over a period can be obtained by integrating the angular velocity ω over the period.

For simplicity of description, the light source 1, half mirror 2, mirror 3 and lenses 4 and 5 are illustrated in FIG. 1 exteriorly of the coil, but actually these elements are disposed inside the coil for synchronous rotation therewith. The screen 9 comprises a light receiver which produces an electric signal representative of the brightness of interfering light. The technique involved in this arrangement is well known in the art and will not be detailed herein.

In the optical gyroscope as has been explained with reference to FIG. 1, this invention features the coupling between the optical fiber 6, linearly polarized light beam A and two input ends 7 and 8 of the optical fiber 6.

An optical fiber 6 in accordance with the present invention comprises an optical fiber of the type which can protect the linearly polarized light beam from being deteriorated in the presence of external disturbance. Such an optical fiber may be called a polarization plane conserving fiber. For example, the optical fiber has a clad 11 or a jacket 12″ of a non-circular cross-section as shown at section in FIG. 2A and section in FIG. 2B and the non-circular or elliptic cross-section has a major axis y and a minor axis x which are so selected that the phase velocity difference, $|\beta_x - \beta_y| = \Delta\beta$, of the light beam propagating along the principal axes corresponding to the major and minor axes is not so small (but at least $2\pi/\Delta\beta$ is less than the radius of the coil).

This type of optical fiber has previously been developed by the inventors of this application and can easily be materialized by preparing a silica tube serving as an outer jacket, forming an $SiO_2$ layer containing $B_2O_3$ and serving as a clad or a second or inner jacket inside the silica tube, forming a layer serving as a core or an optical fiber layer by chemical vapor deposition (CVD) process and forming a solid rod by placing the optical fiber layer in a reduced pressure which is slightly less than the atmospheric pressure, and drawing the rod by heating.

Figure 2A:
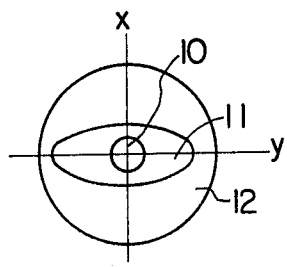
FIGS. 2A and 2B illustrates in sections cross-sectional views of optical fibers embodying the invention for use in an optical gyroscope thereof.
Figure 2B:
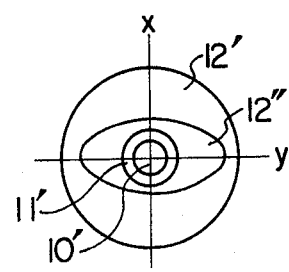

Illustrated in FIG. 2A and 2B are outer jackets 12 and 12′, an inner jacket 12″, clads 11 and 11′, and cores 10 and 10′. The layers 10, 12, 11′ and 12′ are made of $SiO_2$ the layer 11 is made of $SiO_2$ containing $B_2O_3$, the layer 12″ is made of $SiO_2$ containing $B_2O_3$ and $GeO_2$, and the layer 10′ is made of $SiO_2$ containing $GeO_2$.

Figure 3:
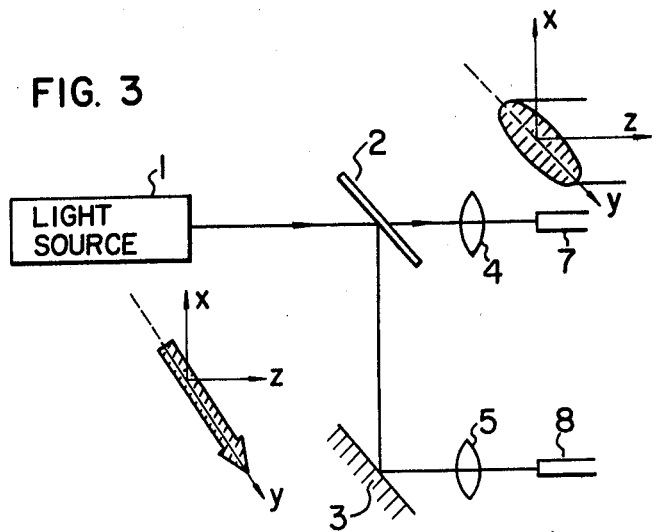
FIG. 3 is a schematic representation useful in explaining the coupling between a light source and the optical fiber in the optical gyroscope in accordance with the invention.

With the optical fiber coil of the above structure, according to the invention, a linearly polarized light beam from a light source (laser) 1 is applied to opposite input ends of the coil in such a manner that its plane coincides with the same principal axis on the opposite ends as shown in FIG. 3, in which the same elements as those in FIG. 1 are designated by the same reference numerals.

The light beam from the laser 1 is a linearly polarized light beam in a direction y. One-half $A_2$ of the light beam is applied to one end 7 of the optical fiber coil via half mirror 2 and lens 4 in such a manner that its polarization plane coincides with the principal axis y (alternatively, the principal axis x) of the optical fiber. Practically, a half-wavelength plate is interposed between the half mirror and the fiber input end 7 for adjustment. The other half $A_1$ of the linearly polarized light beam is reflected by the half mirror 2 and coupled to the other end 8 of the optical fiber coil via reflecting mirror 3 and lens 5 in such a manner that its polarization plane coincides with the same principal axis as that on one end 7, that is, the principal axis y.

In this manner, the light beams $A_1$ and $A_2$ incident on the opposite input ends of the optical fiber pass through the same principal axis and the overall light path length is identical for both the light beams under no rotation of the optical fiber coil.

The principal axis corresponds to the major or minor axis of the elliptic jacket or clad in the cross-sectional structure of the optical fiber as shown in FIGS. 2A and 2B.

Where the core of the optical fiber has a refractive index $N_x$ in the direction of the principal axis x and a refractive index $N_y$ in the direction of the principal axis y, and the wavelength of the light beam is λ, $$\lambda/|N_x - N_y| = 2\pi/\Delta\beta = L$$

is held. From this relation, it will be seen that the smaller the ratio L, the smaller the influence of external disturbance becomes. Therefore, it is preferable that the optical fiber have a large stress birefringence $N_x - N_y$ which, in particular, satisfies $|N_x - N_y| > \lambda/R_o$ in relation to the bending or radius $R_o$ of the coil, because energy conversion takes place between orthogonal dominant modes when $|N_x - N_y| \leq \lambda/R_o$.

What is claimed is:

1. An optical gyroscope comprising a coil of an optical fiber having opposite ends on which linearly polarized input light beams are incident and from which output light beams are derived which create an interference pattern to be detected, wherein said optical fiber has orthogonal principal axes along which the light beams propagate at a large propagation constant difference, and the application of the linearly polarized input light beams to the opposite ends of said optical fiber coil is such that the polarization plane of the linearly polarized light beam coincides with the same principal axis on the opposite ends, wherein said optical fiber has a structure as defined by $$|N_x - N_y| > \lambda/R_o$$

where $N_x$ and $N_y$ are refractive indices of said optical fiber in directions of the orthogonal principal axes, $R_o$ is the radius of said optical fiber coil, and λ is the wavelength of the light beam.

2. An optical gyroscope according to claim 1, wherein said optical fiber comprises at least three concentric layers of a core, a clad and a jacket, said clad layer having an elliptic contour which has major and minor axes corresponding to said orthogonal principal axes.

3. An optical gyroscope according to claim 1, wherein said optical fiber comprises a circular core, a circular clad, an elliptic jacket and an outer jacket which are arranged concentrically in this order, said elliptic jacket having major and minor axes corresponding to said orthogonal principal axes.

4. An optical gyroscope according to claim 2 or 3 wherein said elliptic clad or jacket comprises an $SiO_2$ layer containing at least $B_2O_3$.

* * * * *